(12) United States Patent
Blidegn

(10) Patent No.: US 7,415,180 B2
(45) Date of Patent: Aug. 19, 2008

(54) ACCURATE POSITIONING OF COMPONENTS OF AN OPTICAL ASSEMBLY

(75) Inventor: Kristian Blidegn, Copenhagen (DK)

(73) Assignee: Hymite A/S, Kgs. Lyngby (DK)

( * ) Notice: Subject to any disclaimer, the term of this patent is extended or adjusted under 35 U.S.C. 154(b) by 0 days.

(21) Appl. No.: 11/685,494

(22) Filed: Mar. 13, 2007

(65) Prior Publication Data

US 2007/0153276 A1    Jul. 5, 2007

Related U.S. Application Data

(62) Division of application No. 10/616,521, filed on Jul. 10, 2003, now Pat. No. 7,209,235.

(60) Provisional application No. 60/395,196, filed on Jul. 11, 2002.

(51) Int. Cl.
*G02B 6/26* (2006.01)

(52) U.S. Cl. ....................................................... 385/52

(58) Field of Classification Search .................. 385/52; 356/401; 438/16
See application file for complete search history.

(56) References Cited

U.S. PATENT DOCUMENTS

| 4,449,825 A | 5/1984 | May |
| 4,578,590 A | 3/1986 | Wu |
| 4,596,467 A | 6/1986 | Bartelt |
| 4,728,193 A * | 3/1988 | Bartelt et al. ............... 356/509 |
| 4,912,322 A | 3/1990 | Ichikawa |
| 4,912,530 A | 3/1990 | Bessho |
| 5,182,613 A | 1/1993 | Ieki et al. |
| 5,206,704 A | 4/1993 | Huber et al. |
| 5,333,369 A | 8/1994 | Miyairi et al. |
| 5,343,292 A | 8/1994 | Brueck et al. |

(Continued)

OTHER PUBLICATIONS

Heilmann et al., "Heterodyne Encoder Schemes for Sub-Nanometer Positioning," www.aspe.net/meetings/2001annual, 3 pages.

(Continued)

*Primary Examiner*—Ellen Kim
(74) *Attorney, Agent, or Firm*—Fish & Richardson P.C.

(57) ABSTRACT

A passive alignment technique is disclosed to facilitate accurate positioning of components of an optical assembly. In one aspect, a method includes directing light onto components of an optical assembly in which a first component includes a first pattern of marks with a first frequency and a second component includes a second pattern of marks with a second different frequency. An optical signal corresponding to the superposition of the first and second patterns is detected. Based on the detected optical signal, a determination may be made as to whether the first and second components are properly positioned with respect to one another.

11 Claims, 9 Drawing Sheets

U.S. PATENT DOCUMENTS

| | | |
|---|---|---|
| 5,402,726 A | 4/1995 | Levien |
| 5,781,297 A | 7/1998 | Castore |
| 6,018,391 A | 1/2000 | Yoshida |
| 6,022,154 A * | 2/2000 | Allen .......................... 400/76 |
| 6,067,393 A | 5/2000 | Kitaoka et al. |
| 6,091,481 A | 7/2000 | Mori |
| 6,313,460 B1 | 11/2001 | Haas et al. |
| 6,314,543 B1 | 11/2001 | Yamaguchi |
| 6,316,281 B1 | 11/2001 | Lee et al. |
| 6,320,242 B1 | 11/2001 | Takasu et al. |
| 6,610,446 B2 | 8/2003 | Lercel |
| 6,628,392 B2 | 9/2003 | Kuroda et al. |
| 6,670,632 B1 * | 12/2003 | Fujimoto ...................... 257/48 |
| 2002/0006151 A1 * | 1/2002 | Yamauchi ................... 372/109 |
| 2002/0036777 A1 * | 3/2002 | Tanaka ........................ 356/401 |
| 2002/0081075 A1 | 6/2002 | Miyazaki |

OTHER PUBLICATIONS

"Sparkolor Corporation Announces Passively Aligned Hybrid Flip-Chip Bonding Capability With 0.2 Micrometers . . . ," Photonics Online News for photonics professionals, 2 pages.

Kevin McCarthy, "Accuracy in Positioning Systems," Reprinted from The Motion Control Technology Conference Proceedings, Mar. 19-21, 1991, 15 pages, Feb. 1996.

* cited by examiner

ACCURATE POSITIONING OF COMPONENTS OF AN OPTICAL ASSEMBLY

CROSS-REFERENCE TO RELATED APPLICATIONS

This application is a divisional of U.S. Ser. No. 10/616,521, filed Jul. 10, 2003, which in turn claims the benefit of U.S. Provisional Application No. 60/395,196, filed on Jul. 11, 2002.

BACKGROUND

The disclosure relates to the accurate positioning of components of an optical assembly.

In state of the art technologies, it is often desirable to achieve sub-micron accuracy, for example, of alignment between a photonic device and a light guiding circuit. Such accuracy may be necessary to couple the photonic device and the waveguide to each other with high efficiency. The assembly of such photonic components, however, can be a difficult and costly process.

In some state of the art technologies, a photonic device such as a laser diode chip may be optically coupled to a waveguide on a substrate by an active alignment procedure. During such alignment procedures, the components may be manipulated by highly accurate stages. The incoming or outgoing light signal may be monitored during micromanipulation until the optimal transmitted light is determined. The photonic device may then be mechanically fixed in place relative to the waveguide.

As an alternative to active alignment techniques, some technologies use passive alignment techniques which can avoid the need to oscillate the laser diode chip and measure its output during the alignment procedure.

SUMMARY

In general, a passive alignment technique is disclosed to facilitate accurate positioning of components of an optical assembly. The assembly may include, for example, optoelectronic, pure optical or opto-mechanical components, as well as a combination of such components. Furthermore, the techniques may be used alone or in conjunction with other passive or active positioning techniques.

In one aspect, a method includes directing light onto components of an optical assembly in which a first component includes a first pattern of marks with a first frequency and a second component includes a second pattern of marks with a second different frequency. An optical signal corresponding to the superposition of the first and second patterns is detected. Based on the detected optical signal, it may be determined whether the first and second components are properly positioned with respect to one another.

Various implementations may include one or more of the following features.

For example, in some implementations, the optical signal has a beat frequency that is based on the first and second frequencies. The method may include comparing a pattern corresponding to the detected optical signal to a reference pattern of marks and determining whether the first and second components are properly positioned with respect to one another based on the comparison. In a particular implementation, light may be directed onto a reference pattern of marks in one of the components, where the reference pattern of marks corresponds to a superposition of the first and second patterns. A second optical signal based on the reference pattern of marks in the component may be detected and a determination may be made as to whether the first and second components are properly positioned with respect to one another based on the detected optical signals.

The method may include determining an amount of misalignment between the first and second components and adjusting a relative position of the first and second components to correct for the misalignment. The position of the first and second components may be fixed with respect to one another.

The method may include flipping the first component onto the second component and subsequently directing light onto the components. The optical signal corresponding to the superposition of the first and second patterns of marks may be detected, and a determination may be made as to whether the first and second components are properly positioned with respect to one another based on the detected optical signal.

The patterns of marks may include, for example, digital marks.

In another aspect, an apparatus includes an optical assembly with first and second components. The first component includes a first pattern of marks having a first frequency, and the second component includes a second pattern of marks having a second frequency different from the first frequency. The first and second components are positioned relative to one another such that one of the patterns of marks lies above the other pattern of marks. In some implementations, the first component further includes a third pattern of marks that corresponds to a superposition of the first and second patterns of marks.

The technique may be applied, for example, to check the alignment between a laser diode chip and an optical waveguide in a hybrid integrated structure.

According to another aspect, a method includes providing a bottom cladding layer on a substrate, and providing a core layer over the bottom cladding layer. Using a single mask process, part of the core layer is defined for an optical waveguide and part of the core layer is defined for a template for a first pattern of marks having a first frequency. A top cladding layer is provided over the part of the core layer defining the optical waveguide. The core layer and the bottom cladding layer are etched to form the first pattern of marks, defined by the template, in the bottom cladding layer. The method may include positioning a semiconductor chip that includes a second pattern of marks so that the second pattern of marks overlies the first pattern of marks. The second pattern of marks has a second frequency. Light then is directed onto the first and second patterns. A first optical signal having a beat frequency based on a superposition of the first and second patterns of marks may be detected. A determination may be made as to whether the semiconductor chip is properly positioned based on the detected optical signal.

In various implementations, one or more of the following advantages may be present. The techniques may provide a non-destructive technique for helping determine whether optical components are properly positioned within the submicron range. Use of the beat frequency technique may facilitate the detection and correction of misalignment. Furthermore, in some implementations, the patterns of marks may be formed on the components during existing fabrication processes without additional photolithographic mask steps, thereby facilitating the integration of the present technique into existing fabrication processes. The alignment may be checked in-line during production of the optoelectronic assembly to improve yield.

Other features and advantages will be readily apparent from the following detailed description, the accompanying drawings and the claims.

DETAILED DESCRIPTION

In general, a passive alignment technique is disclosed to facilitate accurate positioning of components of an optical assembly. In one particular implementation, the technique may be used to position a photonic device, such as a laser diode chip, with respect to a light guiding circuit. Respective patterns of marks having slightly different frequencies are formed in the photonic device and the light guiding circuit, and light is directed onto the area of the patterns of marks during the positioning process. When the optical signals that result from the light being reflected by or transmitted through the patterns of marks are superimposed, a slower varying beat frequency may be obtained. Proper alignment can be determined and adjusted based on the resulting beat frequency signal that occurs as a result of the superposition of the patterns of marks. The beat frequency signal can amplify signals representing misalignment between the components so that even relatively small misalignments may be detected and corrected.

Figure 1:
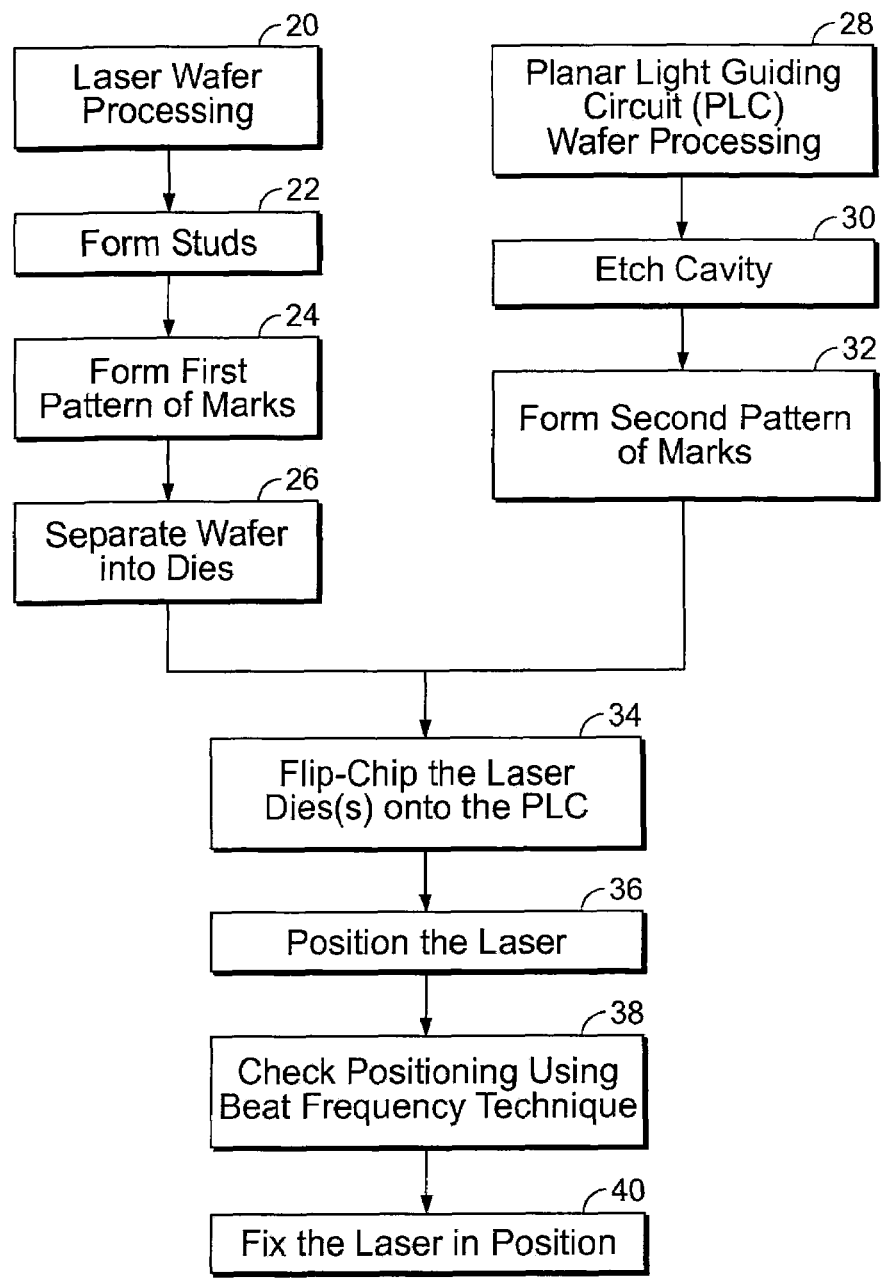
FIG. 1 is a flow chart illustrating an assembly process that incorporates the use of a beat frequency technique.

As illustrated in FIG. 1, a first wafer diode may be processed to form the laser diode or other photonic device (block 20). Processing the laser wafer may include making gold (Au) or other studs for the laser diode (block 22), forming a first pattern of marks for use during the alignment process (block 24), and cleaving the wafer into individual dies (block 26). A second wafer may be processed to form a waveguide structure such as a planar light guiding circuit (PLC) (block 28). Processing the second wafer may include etching the waveguide cavity (block 30) and forming a second pattern of marks for use in the alignment process (block 32). Processing the PLC and laser wafers typically includes other steps as well.

In one implementation, the laser diode chip is flipped onto the light guiding circuit (block 34). The laser diode chip may be rattled gently into position using alignment features discussed below (block 36). More precise positioning of the laser diode chip with respect to the light guiding circuit may be obtained by shining light on the patterns of marks and using the resulting beat frequency to determine and correct any misalignment (block 38). Once the laser diode chip is positioned accurately, it may be fixed in place, for example, by soldering or other techniques (block 40). The beat frequency positioning technique also may be employed after soldering to confirm accurate positioning of the photonic device.

A particular example using the positioning techniques is described below in connection with the hybrid integration of active and passive optical components on a silicon (Si) substrate. The positioning technique is applicable to the assembly of other optoelectronic components as well.

In one implementation, an assembly structure includes an optoelectronic device on a substrate that includes an optical waveguide. The optoelectronic device may be, for example, a light emitting component such as a laser or light emitting diode (LED), or a light receiving component such as a photodiode. Hybrid integration includes aligning the optoelectronic device and the waveguide, and soldering the optoelectronic device to the substrate to secure long-term mechanical stability.

Figure 2:
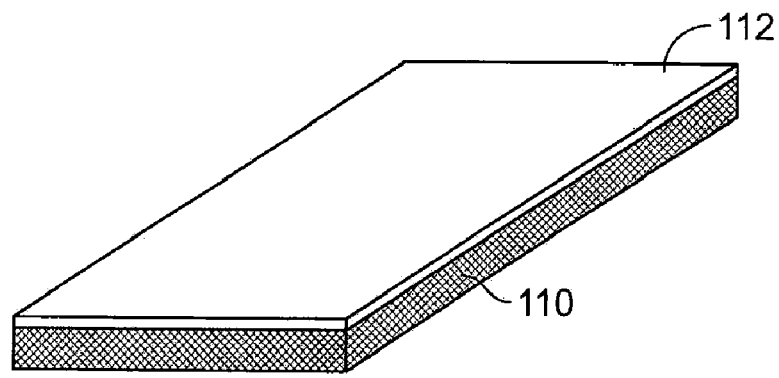
FIGS. 2 through 12 illustrate fabrication of an optoelectronic assembly structure that incorporates patterns of marks for use in the beat frequency technique.

Referring to FIG. 2, a bottom cladding layer 112 is deposited on a substrate 110. The substrate may comprise silicon or some other organic or inorganic substrate material. The bottom cladding layer 112 may include silicon dioxide ($SiO_2$) or other materials different from the core material to be deposited later. The structure includes a first part (the back) and a second part (the front).

Figure 3:
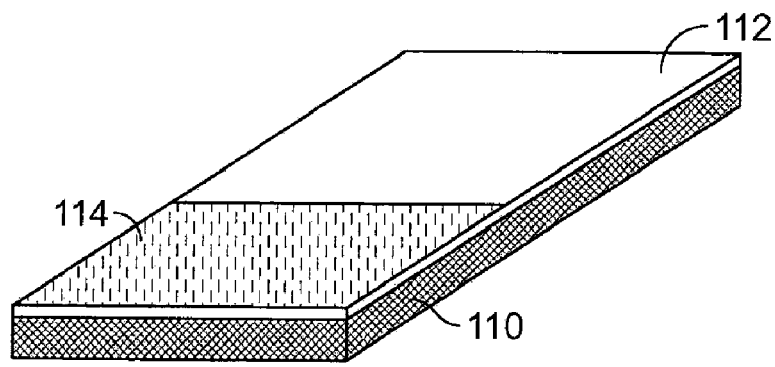
Figure 4:
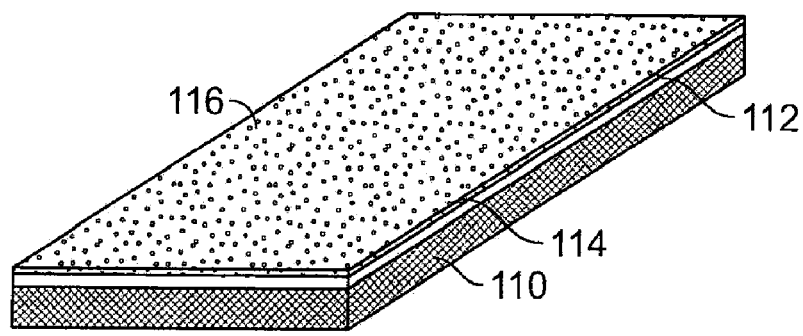

Referring to FIG. 3, an etch layer 114 is deposited on the second part of the bottom cladding layer 112. The etch stop layer may include, for example, silicon, boron-doped polysilicon, metals or other inorganic materials. Next, as illustrated in FIG. 4, the structure is covered with a deposited layer 116 of core glass such as germanium-doped $SiO_2$ or other materials different from the cladding material.

Deposition of the cladding, etch stop and core glass layers may be carried out using, for example, plasma enhanced chemical vapor deposition (PECVD), low pressure chemical vapor deposition (LPCVD) or other vacuum deposition techniques.

Figure 5:
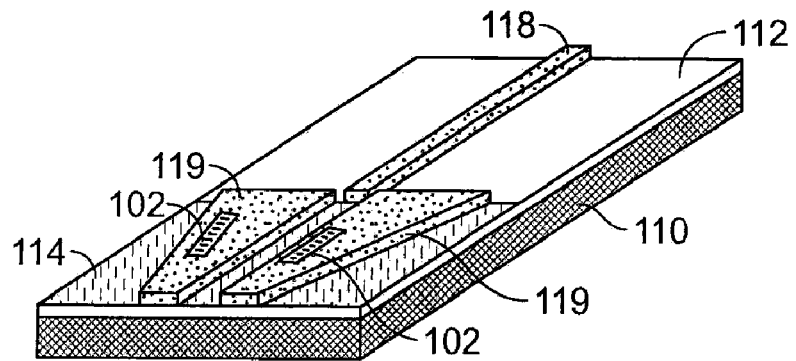

FIG. 5 illustrates formation of the waveguide core and alignment taper templates using a photolithographic process. After the core glass layer is deposited onto the Si wafer, the waveguide core and alignment taper templates are defined in a single photoresist step. A reactive ion etching (RIE) process, for example, may be used to remove the surrounding core glass material to leave only the waveguide core 118 and the alignment taper templates 119. By defining the waveguide core and alignment taper templates simultaneously in a single mask step, good horizontal alignment may be achieved. The same mask and etching process may be used to define a pattern of marks 102 to be used in the subsequent beat frequency alignment technique.

Figure 6:
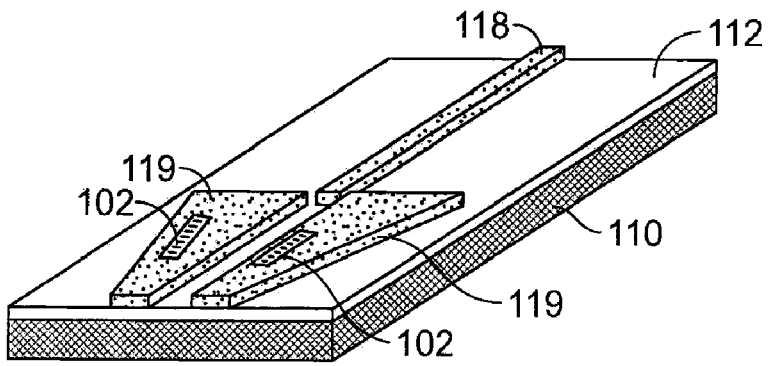
Figure 17A:
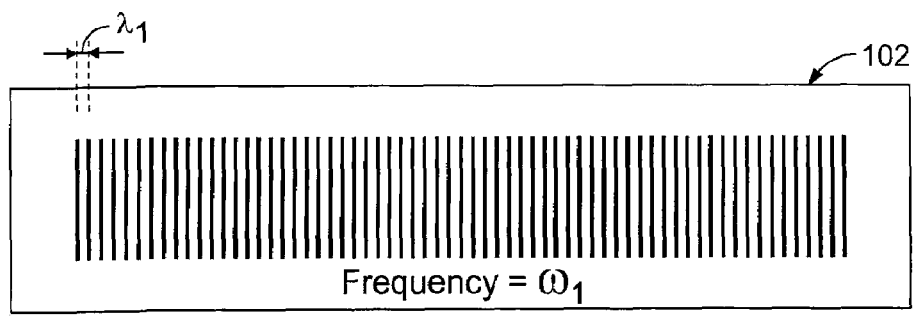
FIGS. 17A through 17C illustrate examples of patterns of marks for use in the beat frequency technique.

FIG. 17A illustrates an example of a first pattern of marks 102 defined in the waveguide circuit. The pattern of marks 102 may comprise, for example, digital marks having a wavelength $\lambda_1$ that corresponds to a frequency $\omega_1 1$. As shown in FIG. 17A, the pattern of marks 102 has a fifty percent duty cycle. However, patterns having other duty cycles may used as well. The pattern of marks 102 may be defined in one or more areas of the waveguide circuit. As shown in FIG. 6, the pattern of marks 102 is defined in each of the areas defined by the alignment tapers 120. The different areas in which the pattern of marks 102 is defined may be in oriented in the same or different directions and may be tilted at an angle with respect to one another.

The portions of the etch stop layer 114 not covered by the alignment taper templates 119, including the areas between the areas defining the marks 102, are removed, for example, by wet or dry etching to expose the bottom cladding layer as shown in FIG. 6.

Figure 7:
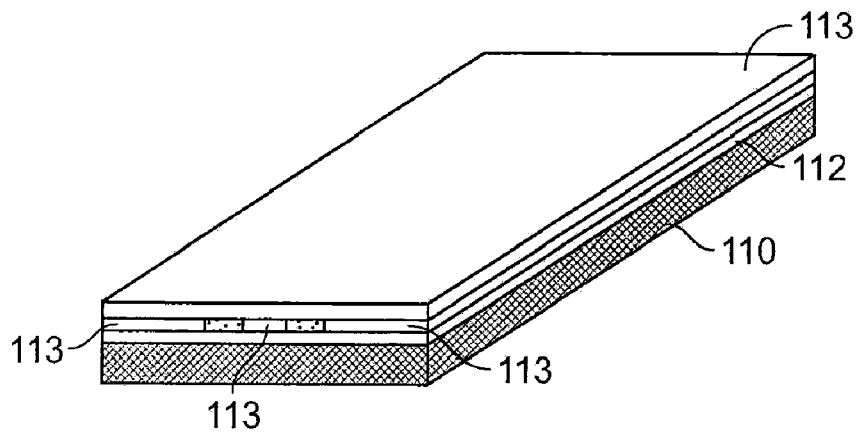

As shown in FIG. 7, a top cladding payer 113, which may be similar to the bottom cladding layer 112, is deposited on the structure of FIG. 6. The waveguide core should be covered by a material that allows the core to guide electromagnetic radiation. The material used for the top cladding layer may depend, in part, on the relative refractive indices of the core 118 and the top cladding layer 113.

Figure 8:
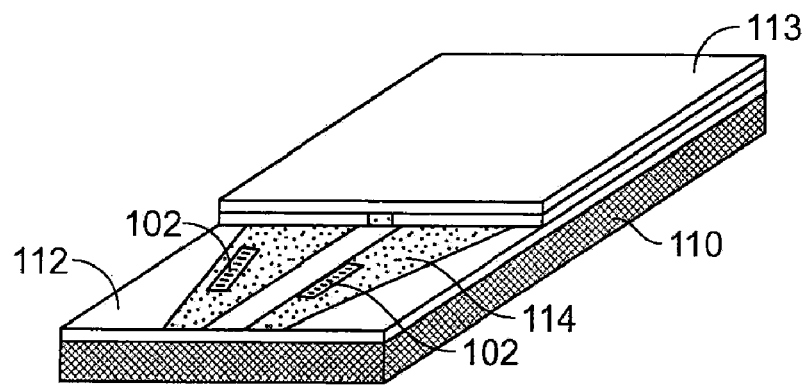

Next, the top cladding layer 113 is removed from the front part of the structure. The portion of the core glass layer that defines the alignment tapers 119 and the pattern of marks 102 also is removed from the front part of the structure to reveal the remaining etch stop layer 114 as shown in illustrated in FIG. 8. An RIE process may be used to remove the top cladding layer as well as the core glass layer on the front part of the structure.

Figure 9:
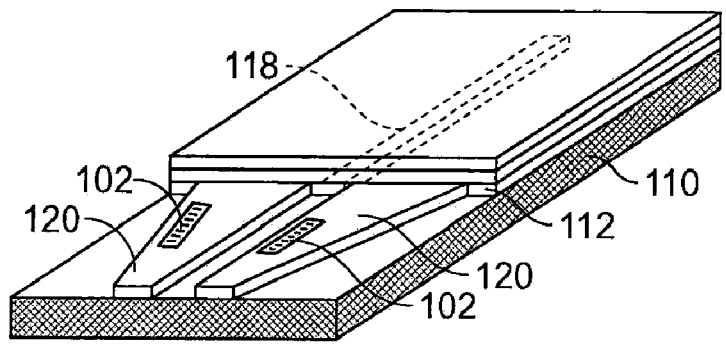

Completion of the etching process forms the alignment tapers 120 and the pattern of marks 102 in the bottom cladding layer 112 as illustrated in FIG. 9. The etch stop layer 114 also is removed during this process to reveal the top surface of the alignment tapers and the marks 102. In the illustrated implementation, the top surface of the bottom cladding layer 112 forms both the top surface of the alignment tapers and the surface on which the waveguide core 118 is deposited. That allows precise vertical alignment to be achieved by placing the photonic device to be aligned on top of the alignment tapers 120.

Figure 10:
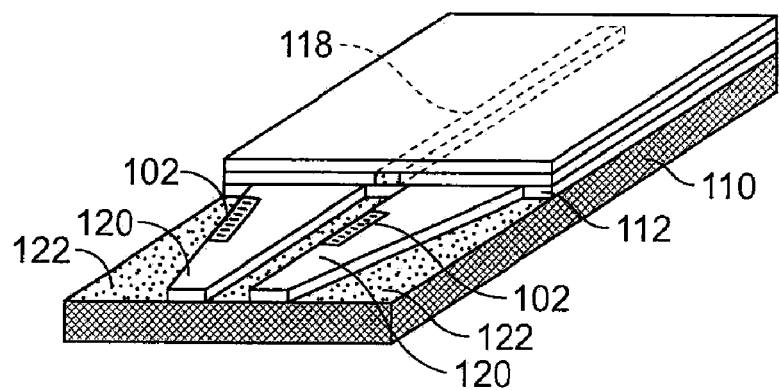

As shown in FIG. 10, metal pads 122 are deposited on the exposed part of the silicon substrate 110 near the alignment tapers 120. The metal pads serve as wetable regions for binding solder to the substrate in a subsequent soldering step. The metal pads may be deposited, for example, by electroplating or vacuum deposition techniques.

Figure 11:
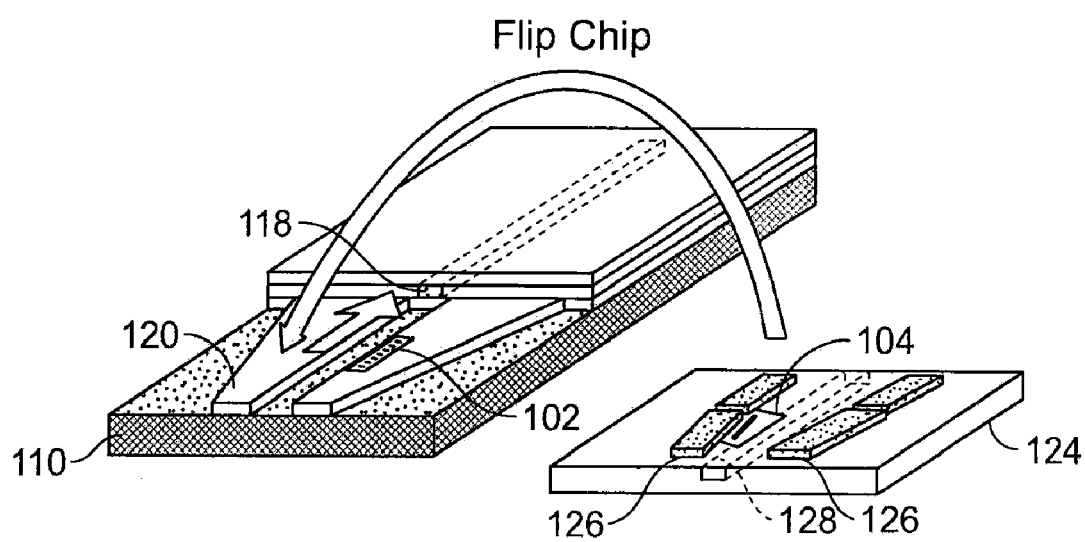

Referring to FIG. 11, the photonic device 124, a semiconductor laser chip in the illustrated example, is presented upside down. The active region 128 of the laser should have its optical axis elevated above the bottom surface of the laser a distance about equal to the distance of the optical axis of the waveguide 118 above the bottom cladding layer 112.

The laser 124 includes one or more alignment features, such as solder stripes 126 deposited symmetrically on the bottom surface of the laser, with the active region 128 in the center. Electroplated stripes of AuSn 80 having smooth surface structures may be used as the solder material.

Figure 17B:
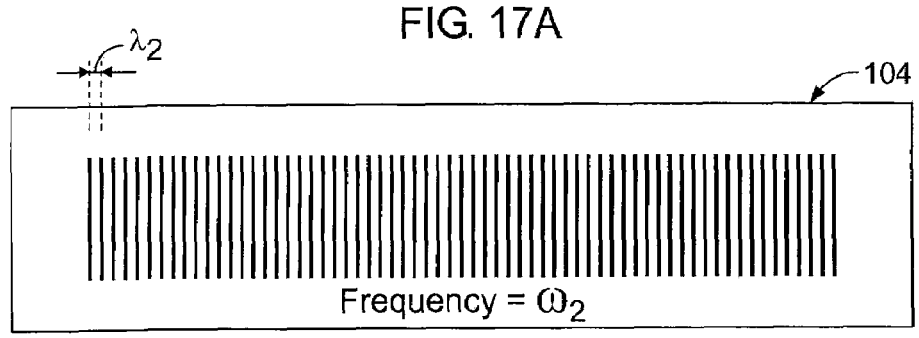

The laser 124 also includes a second pattern of marks 104 for use in the subsequent beat frequency alignment technique. FIG. 17B illustrates an example of the pattern of marks 104 defined in the photonic device 124. The pattern of marks 104 may comprise, for example, digital marks having a wavelength $\lambda_2$ that corresponds to a frequency $\omega_2$. As shown in FIG. 17B, the pattern of marks 104 has a fifty percent duty cycle. Other duty cycles may be used as well. In general, the sum of the duty cycles for the two patterns of marks should be about one hundred percent. The location of the pattern of marks 104 is selected so that when the photonic device 124 is properly positioned on the waveguide circuit and aligned with the waveguide 118, the pattern of marks 104 lies in a position above a corresponding pattern of marks 102 on the waveguide circuit.

The particular wavelengths $\lambda_1$ and $\lambda_2$ used for the patterns of marks 102, 104 depend on the particular application. In general, the wavelengths should be sufficiently close to one another to produce a beat frequency that can be detected when the patterns are superimposed as described below. Criteria that may impact the selection of the frequencies $\omega_1$ and $\omega_2$ as well as the difference or ratio between the frequencies include the resolution of the mask(s) used for the photolithographic processes during fabrication of the waveguide circuit as well as the size of the viewing angle used during the beat frequency alignment technique. In any event, the wavelengths $\lambda_1$, $\lambda_2$ should be capable of being resolved by the masks used during the photolithography processes. In one particular implementation, the wavelength $\lambda_1$ is 10 microns (μm).and the wavelength $\lambda_2$ is 9.6 μm. Different wavelengths, however, may be used in other implementations and, in some cases, $\lambda_2$ may be greater than $\lambda_1$.

Figure 12:
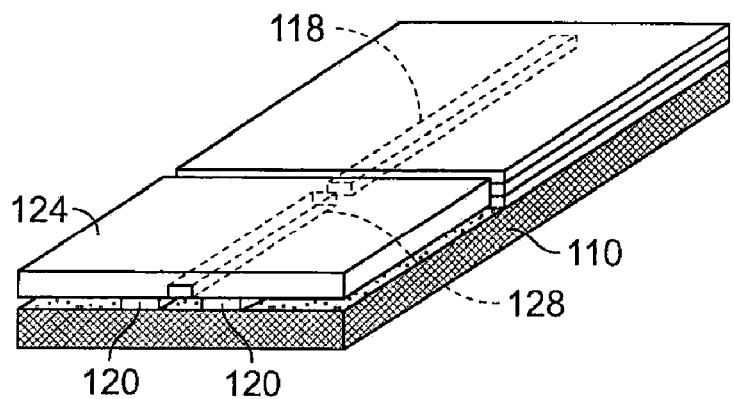

To position the laser chip 124 initially, the laser chip is flipped as indicated by the arrow in FIG. 11 so that the solder stripes 126 fit the alignment tapers 120 and position the active region 128 between the alignment tapers 120. The laser 124 then is slid toward the front part of the assembly structure until the solder stripes abut the alignment tapers as illustrated in FIG. 12. The tapered shape of the alignment tapers 120 guides the laser so that the active region 128 is substantially aligned with the waveguide core 118.

Figure 13:
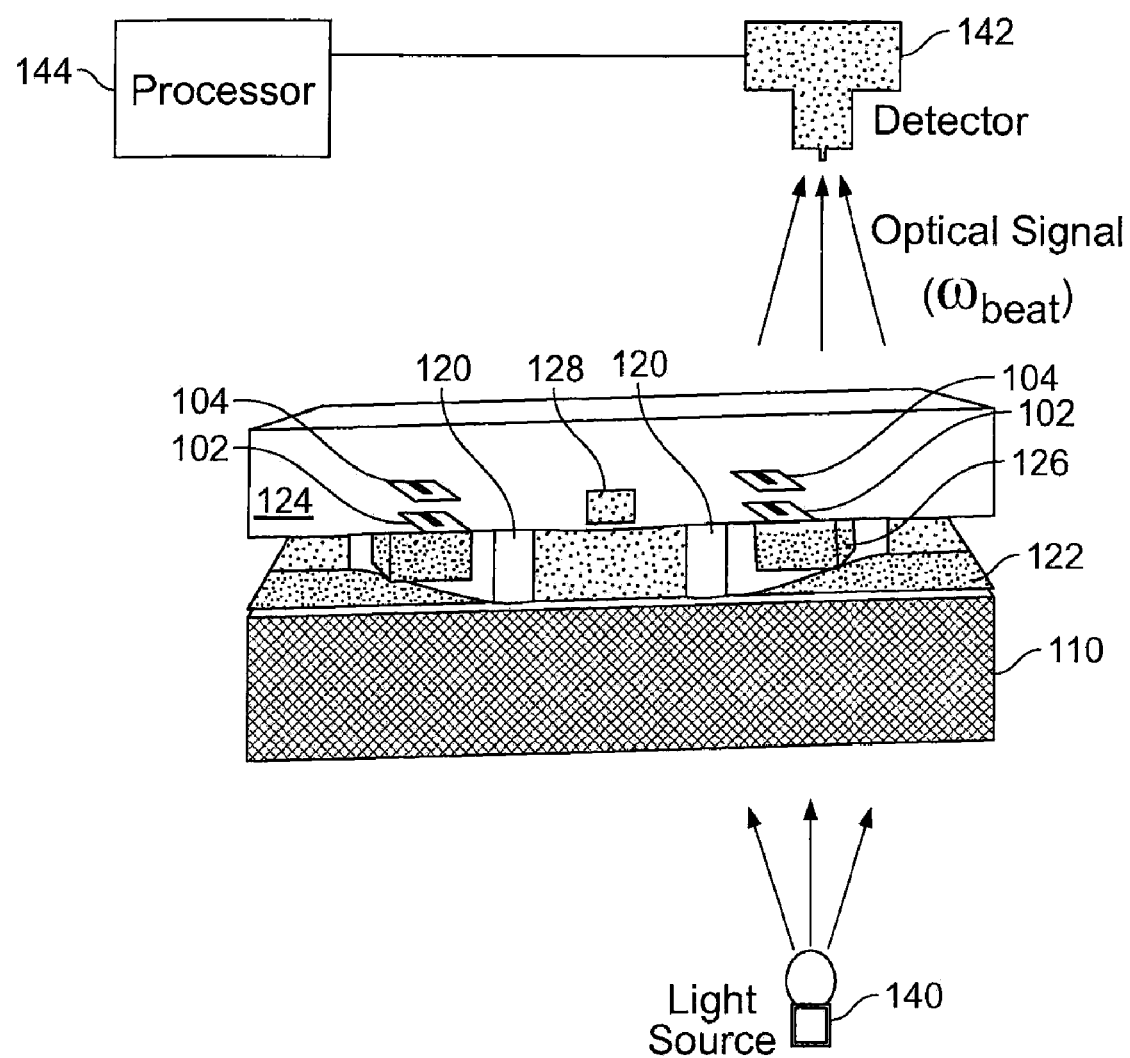
FIG. 13 illustrates a technique for checking alignment of a photonic device and a light guiding circuit using the patterns of marks in the optoelectronic assembly.

Prior to melting the solder stripes 126 to fix the photonic device in place, the beat frequency technique may be performed to determine whether the device 124 is properly aligned horizontally with respect to the waveguide circuit. As illustrated by FIG. 13, infrared or other light from a light source 140 is directed from one side of the assembly onto the area of a pair of patterns of marks 102, 104. An optical detector that may include an array of light detectors such as CCD sensors captures the light passing through the assembly and through the patterns of marks 102, 104. The materials of the photonic device 124 and the waveguide substrate 110 should be transparent to at least some of light emitted by the light source. For example, in the illustrated implementation, if the waveguide substrate and the photonic device comprise silicon and indium phosphide (InP), respectively, then a light source emitting infrared light with a wavelength of about 1 μm may be used. The light source may be a single mode source, although other light sources may be used as well.

Figure 17C:
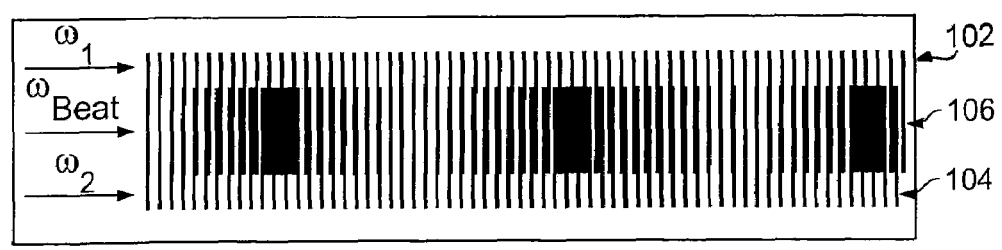

If the device 124 is properly positioned with respect to the waveguide circuit, then the optical signal detected by the optical detector 142 will include a superposition of the two patterns of marks 102, 104 which results in a pattern of marks 106 (see FIG. 17C) having a beat frequency $\omega_{beat}$, where $\omega_{beat}$ is about $(\omega_2-\omega_1)$ for $\omega_2$ greater than $\omega_1$. For example, if the wavelength $\lambda_1$ is 10 microns (μm) and the wavelength $\lambda_2$ is 9.6 μm, then the wavelength $\lambda_{beat}$ of the superimposed signal may be about 240 μm.

The output of the optical detector 142 may be converted to corresponding electrical signals which are provided to a digital processor 144 for analysis, including comparison to the expected pattern of marks 106. One advantage of detecting the superimposed pattern of marks using the beat frequency technique is that, for $\omega_2$ greater than $\omega_1$, the frequency of the resulting pattern is amplified by about $\omega_2/(\omega_2-\omega_1)$. For the example, discussed above, the amplification of the misalignment would be about twenty five. Use of the beat frequency technique can permit resolution and detection of a misalignment on the order of tenths of a micron. Therefore, horizontal misalignment and yaw of the photonic device may be more easily detected and corrected.

If a misalignment is detected, the processor 144 can estimate the amount of misalignment and adjust the position of the device 124. To estimate the amount of misalignment, the processor 144 may compare the detected pattern to a reference signal that represents the ideal position of the laser chip.

The reference signal may be based on prior tests and may be stored in memory (not shown) associated with the processor 144.

Figure 16:
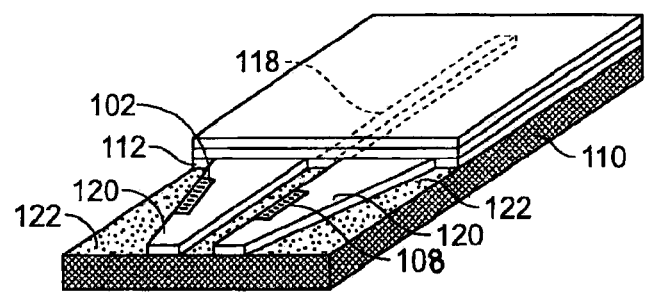
FIG. 16 illustrates a substrate for a light guiding circuit that includes a reference pattern of marks for use in the beat frequency technique.

Alternatively, the reference signal may be based on a reference pattern of marks 108 formed on the waveguide circuit substrate 110 (see FIG. 16). The reference pattern may include a superposition of the two patterns of marks 102, 104 as illustrated by the pattern 106 in FIG. 17C, and may be formed in the waveguide circuit substrate at the same time as the first pattern of marks 102 (see FIGS. 5-9). By directing light from the source 140 onto the assembly and through the reference pattern of marks 108, the detector 142 can detect an optical signal with a beat frequency ωbeat that serves as the reference signal. The processor 144 may determine sinusoidal curves that approximate the beat frequency optical signals and use the phase difference of the sinusoidal curves as a measure of the misalignment.

Figure 14:
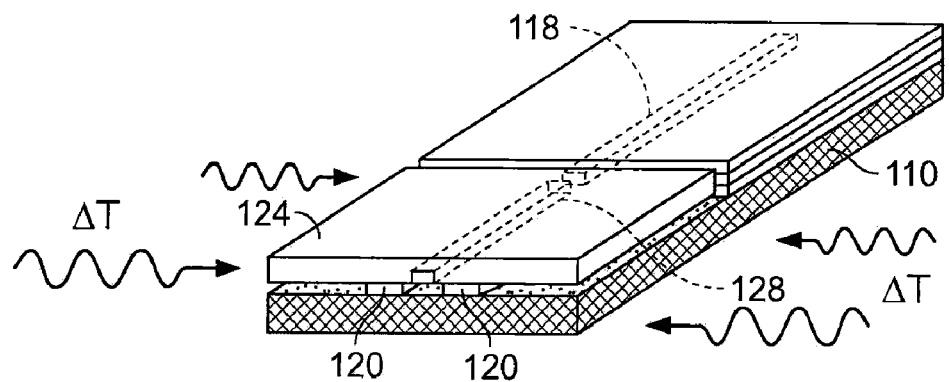
FIG. 14 illustrates a heating process to fix the components of the assembly structure in place.
Figure 15:
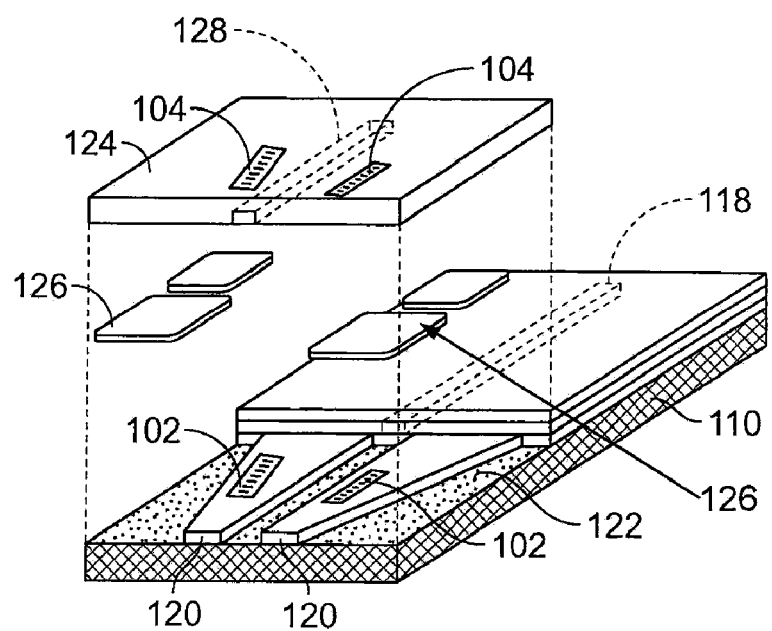
FIG. 15 is an exploded view of FIG. 14.

After adjusting the position of the device 124 to correct any misalignment (if any), the assembly is heated to melt the solder stripes 126 as illustrated by FIG. 14. As a result of the heating process, excess solder may flow along the metal pads 122 (see the exploded view of FIG. 15) to make thermal and electrical contact to the silicon substrate 110.

After the device 124 is fixed in place, the beat frequency technique described above in connection with FIG. 13 may be repeated to confirm that proper alignment.

Although specific structures for the waveguide circuit and the photonic device are described and illustrated above, the beat frequency technique can be used to check the position of other components in other optical assembly structures as well. The components to be positioned with respect to one another may be optoelectronic components, pure optical components, opto-mechanical components or a combination of different types of optical componentns. An optical signal having a beat frequency that is based on superimposed patterns of marks on the optical components that are to be positioned relative to one another can be compared to a reference signal to determine the extent of misalignment (if any).

Figure 18:
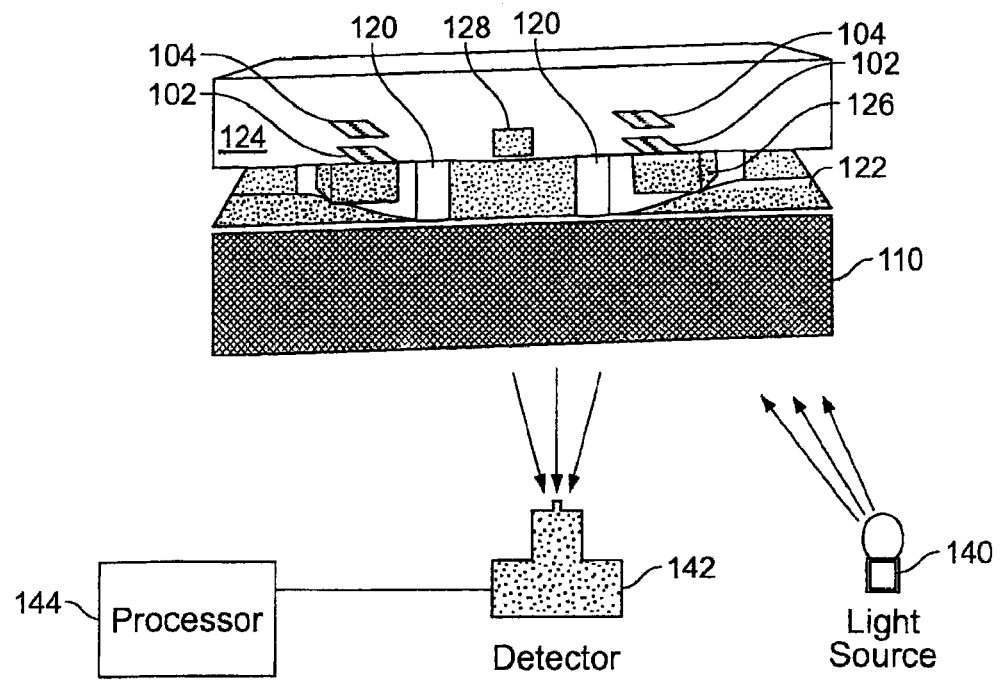
FIG. 18 illustrates another implementation of a technique for checking alignment of a photonic device and a light guiding circuit using the patterns of marks in the optoelectronic assembly.

The beat frequency technique illustrated in FIG. 13 shows that the light source 149 and detector 142 are positioned on opposite sides of the assembly structure so that the light passes through the assembly structure to be detected on the side opposite the light source. However, the technique also may be used in a reflective mode in which the light source 140 and detector 142 are positioned on the same side of the assembly as shown in FIG. 18.

Similarly, the reference pattern of marks may be formed on either one of the components that are to be positioned relative to one another.

Other implementations are within the scope of the claims.

What is claimed is:

1. A method comprising:
    providing a bottom cladding layer on a substrate;
    providing a core layer over the bottom cladding layer;
    defining, by a single mask process, part of the core layer for an optical waveguide and part of the core layer for a template for a first pattern of marks, the first pattern of marks having a first frequency;
    providing a top cladding layer over the part of the core layer defining the optical waveguide;
    etching the core layer and the bottom cladding layer to form the first pattern of marks, defined by the template, in the bottom cladding layer;
    positioning a semiconductor chip that includes a second pattern of marks so that the second pattern of marks overlies the first pattern of marks, the second pattern of marks having a second frequency;
    directing light onto the first and second patterns;
    detecting a first optical signal, the first optical signal having a beat frequency based on a superposition of the first and second patterns of marks; and
    determining whether the semiconductor chip is properly positioned based on the detected optical signal.

2. The method of claim 1 including:
    defining, by said mask process, part of the core layer for a template for a reference pattern of marks, the reference pattern corresponding to a superposition of the first and second patterns of marks; and
    forming the reference pattern of marks, defined by the template for the reference pattern, in the bottom cladding layer.

3. The method of claim 2 including:
    directing light onto the reference pattern of marks;
    detecting a second optical signal based on the reference pattern of marks; and
    determining whether the semiconductor chip is properly positioned with respect to the waveguide based on the first and second detected optical signals.

4. The method of claim 1 wherein the first and second patterns of marks comprise digital marks.

5. The method of claim 4 wherein the first pattern of marks has approximately a fifty percent duty cycle.

6. The method of claim 1 including fixing the semiconductor chip in place with respect to the optical waveguide.

7. An apparatus comprising:
    an optical assembly comprising first and second components, wherein the first component includes a first pattern of marks having a first frequency, and the second component includes a second pattern of marks having a second frequency different from the first frequency, wherein the first and second components are positioned relative to one another such that one of the patterns of marks lies above the other pattern of marks, the first component further including a third pattern of marks corresponding to a superposition of the first and second patterns of marks.

8. The apparatus of claim 7 wherein the first component includes a waveguide structure and the second component includes a photonic device.

9. The apparatus of claim 8 wherein the second component includes a flip-chip, and wherein the photonic device is substantially aligned with a core of the waveguide structure.

10. The apparatus of claim 7 wherein the first component comprises an optical waveguide structure including:
    a substrate;
    a bottom cladding layer on the substrate;
    an optical waveguide core on the bottom cladding layer; and
    an upper cladding layer over the waveguide core,
    the first pattern of marks being defined in the bottom cladding layer.

11. The apparatus of claim 7 wherein the first pattern of marks has approximately a fifty percent duty cycle.

* * * * *